United States Patent [19]

Sada

[11] Patent Number: 4,765,076
[45] Date of Patent: Aug. 23, 1988

[54] ADVERTISING APPARATUS FOR TELEPHONE AND INFORMATION DISPLAY APPARATUS

[75] Inventor: Yoshiaki Sada, Ryuugasaki, Japan

[73] Assignee: Kaneken Incorporated, Tokyo, Japan

[21] Appl. No.: 826,996

[22] Filed: Feb. 7, 1986

[30] Foreign Application Priority Data

| Mar. 20, 1985 | [JP] | Japan | 60-40867[U] |
| May 31, 1985 | [JP] | Japan | 60-82308[U] |
| May 31, 1985 | [JP] | Japan | 60-82309[U] |
| Jul. 9, 1985 | [JP] | Japan | 60-104760[U] |

[51] Int. Cl.⁴ .................................................. G09F 13/00
[52] U.S. Cl. ........................................ 40/219; 40/546; 40/582; 40/900; 40/615; 362/88; 362/812
[58] Field of Search ............... 40/219, 553, 574, 615, 40/546, 582, 900; 362/88, 31, 812

[56] References Cited

U.S. PATENT DOCUMENTS

| 1,457,347 | 6/1923 | Collins | 362/88 |
| 1,663,030 | 3/1928 | Underwood et al. | 40/553 |
| 1,997,533 | 4/1935 | Murray | 40/553 |
| 2,095,558 | 10/1937 | Oberacker | 362/812 |
| 2,114,711 | 4/1938 | Horinstein | 40/900 |
| 2,221,887 | 11/1940 | White | 40/219 |
| 2,247,545 | 1/1941 | Deck et al. | 40/219 |
| 2,566,458 | 9/1951 | Macau | 362/812 |
| 2,677,043 | 4/1954 | Hawk | 362/88 |
| 2,795,069 | 6/1957 | Hardesty | 40/546 |
| 2,821,038 | 1/1958 | Gil | 40/553 |
| 2,881,306 | 4/1959 | Sherron | 40/553 |
| 3,140,831 | 7/1964 | Strange | 362/31 |
| 3,752,974 | 8/1973 | Baker et al. | 362/31 |
| 4,337,590 | 7/1982 | Jackson | 40/219 |
| 4,386,476 | 6/1983 | Schulman | 40/546 |
| 4,564,729 | 1/1986 | Mills | 362/88 |
| 4,638,605 | 1/1987 | Rosa | 40/553 |

FOREIGN PATENT DOCUMENTS

| 831643 | 1/1939 | France | 362/88 |
| 2393383 | 2/1979 | France | 40/900 |
| 2141280 | 12/1984 | United Kingdom | 40/553 |

Primary Examiner—Carl D. Friedman
Assistant Examiner—Caroline D. Dennison
Attorney, Agent, or Firm—Birch, Stewart, Kolasch & Birch

[57] ABSTRACT

An advertising apparatus for a telephone includes a box provided with an advertising plate disposed in the front thereof and illuminating lamp disposed inside thereof, a power source for the illuminating lamp, detection means for detecting used and unused conditions of the telephone and a control for controlling an on and off condition of the illuminating lamp in response to an output of a detection device. An information display apparatus includes a light source, a light transmitting plate for transmitting light incident from the light source, a light scattering transmissive plate for irregularly reflecting light produced from one side surface of the light transmitting plate, an information display film disposed at the front of the light scattering plate and on which information is displayed, a light transmissive front plate disposed in the front of the information display film, a frame for supporting the preceding members and a control unit for controlling an on and off condition of the light source.

6 Claims, 5 Drawing Sheets

ADVERTISING APPARATUS FOR TELEPHONE AND INFORMATION DISPLAY APPARATUS

FIELD OF THE INVENTION

The present invention relates to a telephone incorporating an advertisement display unit, an advertising apparatus used in a telephone box and an advertising apparatus installed, for example, near the telephone.

BACKGROUND OF THE INVENTION

There is provided with a billboard for fixedly attaching posters on a stand for placing a telephone set. Further, an advertising apparatus which is installed within a train or in a station is provided with illuminating means disposed within a box to illuminate an advertising photographed film from the back side thereof.

PROBLEMS THAT THE INVENTION IS TO SOLVE

With the prior art advertising apparatus having the function of the telephone stand and capable of being installed near the telephone, advertising effectiveness of the apparatus is small since the posters are always merely attached. On the other hand, the advertising apparatus which illuminates the photographed film from the back side thereof is difficult to dispose near the telephone in view of the size thereof. Further, the apparatus is not provided with a control mechanism for a light source and hence the light source is always turned on. Accordingly, it is not only expensive but also poor for calling attention to the display.

It is a first object of the present invention to provide an economical advertising apparatus or a telephone incorporating the advertising apparatus which utilizes the speciality of a limited space near a telephone and includes an illuminating unit which is turned on only when a person is present near the apparatus.

When the advertising apparatus is installed in a telephone box, a design which spoils the beauty of a street is not desirable even in the telephone box since four sides of the present telephone box are formed of a transparent glass. When an advertising apparatus is also installed near the telephone installed in a store, the beauty of the store may be spoiled due to unnecessary advertisement.

It is a second object of the present invention to provide an advertising apparatus or a telephone incorporating the advertising apparatus which becomes a mirror for reflecting a street or is a milk white box when no person is present near a telephone and there is no advertising effectiveness.

MEANS OF SOLVING THE PROBLEMS

In order to achieve the above object, there is provided an advertising apparatus for a telephone comprising a box including a front plate disposed at the front thereof including a milk white, semitransparent substrate, a half-mirror and an advertising photographed film interposed between the substrate and the half-mirror and illuminating means disposed inside thereof, a power source for supplying the illuminating means with power, detection means for detecting used and unused conditions of a telephone and control means for controlling the on and off condition of the illuminating means in response to an output of the detection means.

Further, there is provided a telephone equipped with an advertising display unit comprising a box including an advertising plate disposed at the front thereof and illuminating means disposed inside thereof, a power source for supplying the illuminating means with power, detection means for detecting used and unused conditions of the telephone and control means for controlling the on and off condition of the illuminating means in response to an output of the detection means.

Further, there is provided a telephone incorporating an advertising apparatus and an information display apparatus each comprising a light source, a light transmitting plate for transmitting light incident from the light source, a light scattering transmissive plate for irregularly reflecting light produced from one side surface of the light transmitting plate, an information display film disposed at the front of the light scattering plate and on which information is displayed, a light transmissive front plate disposed at the front of the information display film, a frame which supports the preceding members and a control unit for controlling the on and off condition of the light source.

OPERATION (i) When the light transmitting plate is not used:

While the internal illuminating means is turned on, the advertising film is illuminated from the back side thereof by light whose distribution of intensity is uniform over the milk white, semitransparent substrate. The light transmitted through the film is further transmitted through the half-mirror plate and hence the advertisement can be seen from the outside.

While the internal illuminating means is not turned on, since the inside of the box is dark, the half-mirror reflects outside light and a street. At this time, the advertisement depicted on the film can not be seen from the outside.

The turning on and off of the illuminating means is controlled by using a relay, which is operated in response to the on-hook and off-hook conditions of the telephone, as the detection means and turning on and off the power source on the basis of the output signal.

There may be provided a circuit which obtains a communication signal between a telephone and a telephone office when the telephone is connected to the telephone office and the circuit can be used as the detection means.

(ii) When the light transmitting plate is used:

Light emitted from the illuminating unit composed of, for example, a fluorescent light is propagated through the inside of the light transmitting plate while being multiply reflected in the light transmitting plate. The light is substantially uniformly distributed in intensity by the multi-reflection in the light transmitting plate and the light scattering of the light scattering plate and illuminates the advertising film disposed at the front of the light scattering plate from the back side of the film. In the case where the front plate disposed at the front of the film is semitransparent, when the internal illumination is turned off, the advertising portion becomes a mirror. In the case where the front plate is a light milk white plate, when the internal illumination is turned off, the advertising portion becomes a white plate. The illuminating unit can be maintained to be on at all times, while the presence of a person near the apparatus is detected so that the illumination is turned on only while the person is present or the illumination can be turned on only during a predetermined time for the detection of the presence of the person. For example, when a coin is inserted or when a telephone is connected, the illumination is turned on, while the illumination is otherwise always turned off. Consequently, wasteful energy can be not consumed.

DETAILED DESCRIPTION OF THE PREFERRRED EMBODIMENTS

Figure 1:
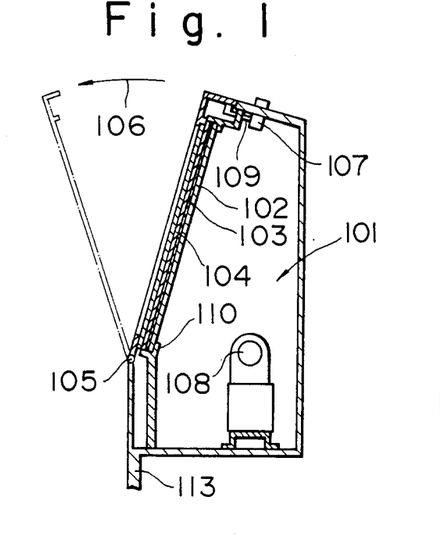
FIG. 1 is a cross-sectional side view of a preferred embodiment of an advertising apparatus for a telephone according to the present invention.
Figure 2:
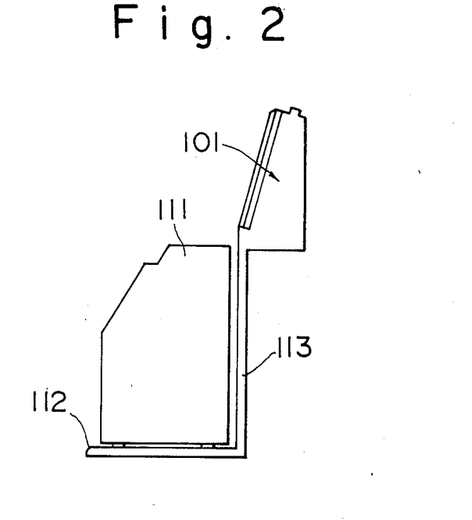
FIG. 2 is a side view of the advertising apparatus of FIG. 1.

An advertising apparatus for a telephone shown in FIG. 1 is used as a stand for placing a telephone thereon as shown in FIG. 2 and an advertising surface is disposed the upper rear part of the telephone.

FIG. 1 is a cross-sectional side view of only a box which is an upper portion of the apparatus.

The box 101 has at the front thereof a front plate which includes a milk white semitransparent substrate 102 composed of, for example, acryl material, a plastic film (corretone film) 103 disposed on the semitransparent substrate 102 and includes a printed advertisement thereon, the film thickness being about 0.1 mm, and a half-mirror 104 disposed on the film 103. The half-mirror 104 includes a lower end which is rotatably mounted to a housing of the box by means of a hinge 105 and an upper end which is fixed to an upper surface of the housing by a cylinder lock 107.

A fluorescent light 108 is provided in the box as illuminating means. When the fluorescent light is turned on, the inside of the box is bright and the advertisement on the film appears. When the fluorescent light is turned off the inside of the box is dark. Consequently, the advertisement on the film disappears and the half-mirror reflects the outside light.

Figure 3:
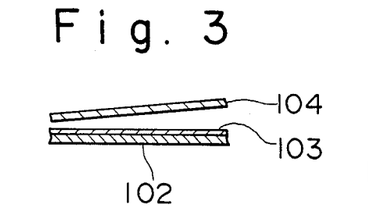
FIG. 3 is a cross-sectional view of a front plate of the advertising apparatus of FIG. 1.

When the advertisement is exchanged, the cylinder lock 107 shown in FIG. 1 is released so that a lock 109 on an upper portion of the front plate is released. The front plate is rotated in the direction of arrow 106 around the hinge 105. At this time, only the half-mirror 104 is rotated as shown in FIG. 3 and the substrate 102 and the film 103 are left on a supporting frame 110 so that the advertising film is exposed. Thus, the film can be easily exchanged. After exchanging the film, the half-mirror is overlapped on the film and the cylinder lock is locked.

As shown in FIG. 2, the box 101 is coupled through a box supporter 113 with a portion for placing the telephone thereon.

Figure 4:
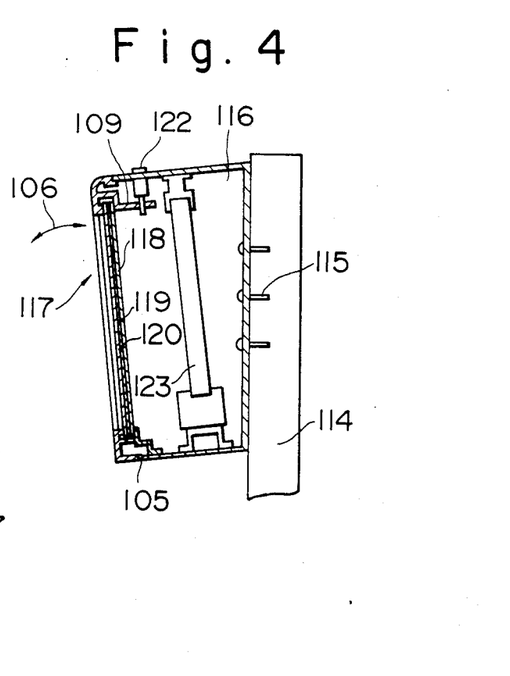
FIG. 4 is a cross-sectional side view of another preferred embodiment of an advertising apparatus for a telephone according to the present invention.

An advertising apparatus according to another embodiment shown in FIG. 4 is attached on a rod member 114 such as a steel pipe disposed vertically in a telephone box by means of screws 115 at an upper portion of a telephone (not shown).

Figure 5:
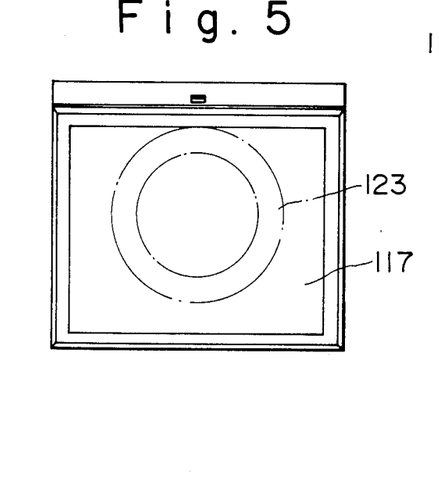
FIG. 5 is a front view of the advertising apparatus of FIG. 4.

The advertising apparatus of this embodiment is disposed at a relatively higher position and a front plate 117 of a box 116 of the apparatus is thus tilted to be directed slightly downward. The structure of the front plate 117 is substantially identical with the embodiment of FIG. 1, that is, an advertising film 119 is overlaid on a milk white semitransparent plate 118 and a half-mirror 120 is overlaid on the film. The half-mirror is at the lower portion thereof swingably attached to a housing of the box by means of a hinge and at the upper portion thereof fixed by means of a cylinder lock 122. The embodiment shown in FIGS. 4 and 5 adopts an annular fluorescent light 123 as illuminating means.

The exchange of the advertising film on which a copy and/or a photograph for advertisement is printed is made by angularly moving only the half-mirror in the same manner as in the embodiment of FIG. 1.

Figure 6:
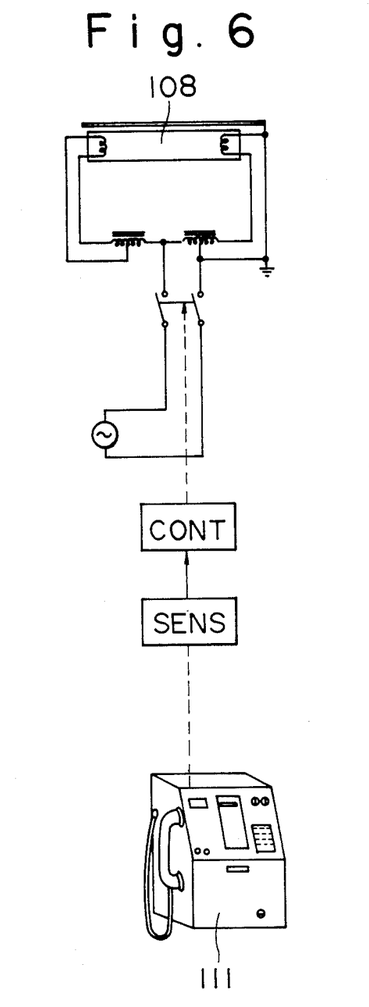
FIG. 6 is a schematic circuit diagram when a flourescent light is utilized as an illuminating unit.

The fluorescent light 108 is controlled to be turned on and off by a control switch of a relay or the like as shown in the circuit of FIG. 6, for example, so that the light is turned on only when the telephone is used. For this purpose, a switch is provided which is turned on and off when a handset of the telephone is lifted up from a cradle, that is, a supporter for the handset is provided in the supporter for the handset. The switch is used as detection means SENS for detecting used and unused conditions of the telephone. An ON/OFF output signal of the switch is applied to a control circuit CONT to control the control switch such as relay. Alternatively, there is provided a circuit which detects a connection signal of the telephone from communication signals between the telephone and the telephone office and is used as detection means.

Figure 7:
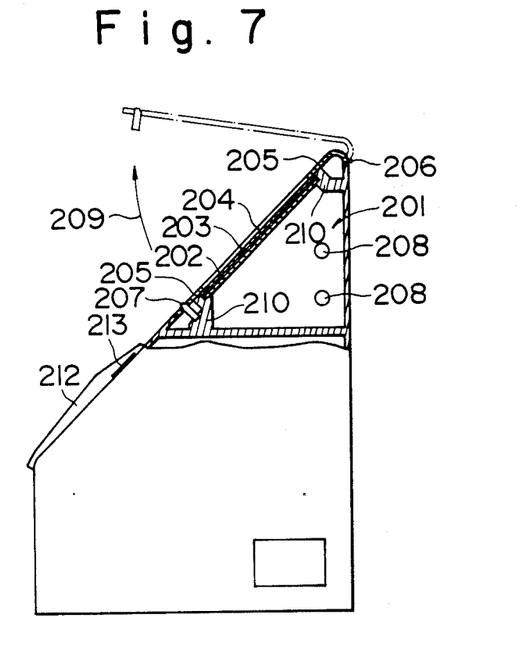
FIG. 7 is a partial cross-sectional side view of a preferred embodiment of a telephone according to the present invention.
Figure 8:
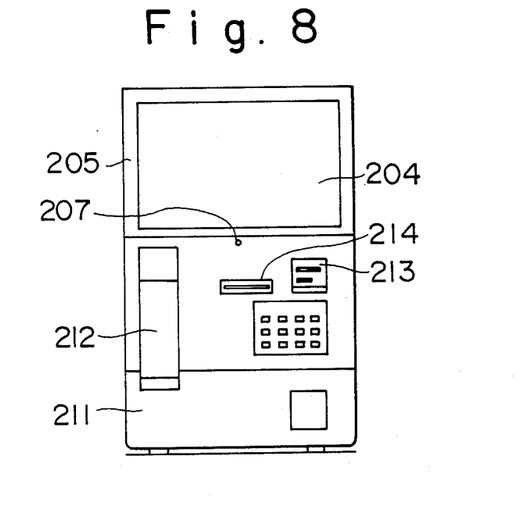
FIG. 8 is a circuit diagram of a lighting circuit when an illuminating circuit utilizes a fluorescent light.

In another embodiment shown in FIGS. 7 and 8, an advertisement display unit is provided above the telephone and an advertising surface appears above the telephone.

The box 201 has at the front thereof a front plate which includes a milk white semitransparent substrate 202 composed of, for example, acryl material, a film 203 disposed on the semitransparent substrate 202 and a printed advertisement thereon, the film thickness being about 0.1 mm, and a half-mirror 204 disposed on the film 103. A frame 205 supporting the half-mirror 204 includes an upper portion thereof which is rotatably attached to a body of the box by a hinge 206 and a lower portion thereof which is fixed to the front surface of the body by a cylinder lock 207.

The box contains fluorescent lights 208 as illuminating means. When the light is turned on, the inside of the box is bright and the advertisement on the film appears. When the light is turned off, the inside of the box is dark and the advertisement disappears, so that the half-mirror reflects the outside light.

When copy for an advertisement is exchanged, the cylinder lock 207 of FIG. 7 is released and the front plate is angularly moved in the direction of arrow 209 around the hinge 205. At this time, only the half-mirror 204 and the frame 205 are angularly moved in the same manner as in FIG. 2 and the substrate 202 and the film 203 are left in a supporting frame 210. Consequently, the advertising film is exposed to exchange the film easily. After exchange of the film, the half-mirror is again overlapped on the film and the cylinder lock is locked.

The turning on and off of the fluorescent lights 208 is controlled, using the similar circuit to that of FIG. 6, by a signal from a telephone set 211 disposed under the half-mirror 204 and the frame 205 of the advertising display portion. For example, lifting up a handset 212, receiving a coin from a slot 213, inserting a card from a card inlet 214, or receiving a signal between the telephone and a telephone office is detected by detection means SENS and a control unit CONT controls the fluorescent lights 208 on the basis of a signal from the detection means SENS.

An advertising plate of the above embodiment is composed of the milk white semitransparent substrate 202 formed of acryl material, the film 203 on which the advertisement is printed and the half-mirror 204. However, the advertising plate is not limited to this structure and a light milk white transparent plate can be used instead of the half-mirror 204. The film 203 and the half-mirror can also be integrally formed. Further, only the frame 205 can be angularly moved instead of the structure in which the half-mirror 204 is supported by the frame 205 and the half-mirror 204 and the frame 205 are integrally rotated.

Figures 9, 10, 11, 12:
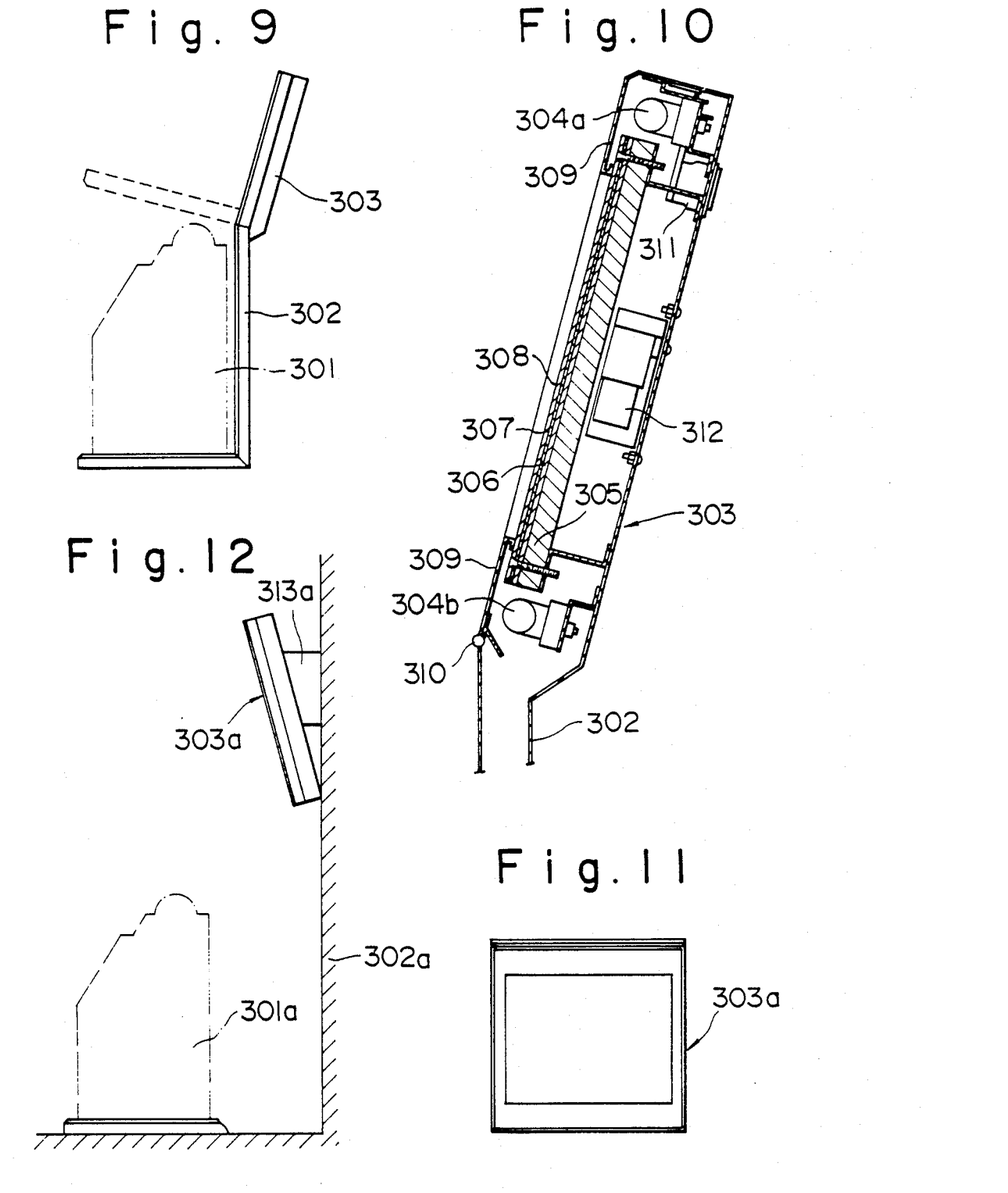
FIG. 9 is a front view of a preferred embodiment of a telephone according to the present invention.
FIG. 10 is a partial cross-sectional view of an embodiment of FIG. 9.
FIG. 11 is a front view of another preferred embodiment of the present invention.
FIG. 12 is a side view of the embodiment of FIG. 11.

An advertising apparatus of FIGS. 9 and 10 has the function of a stand for placing a telephone thereon and comprises an advertisement display unit 303 which is located at the upper end of a perpendicular supporter 302 disposed at the back of a telephone 301.

A structure of the advertisement display unit is now described.

Fluorescent lights 304a and 304b are provided as illuminating means at the upper and lower portion in the advertisement display unit 303 and a rectangular transparent plate 305 formed of, for example, glass or acryl resin and having planar ends opposed to the fluorescent lights 304a and 304b is disposed between both the fluorescent lights 304a and 304b as a light transmitting plate. Light emitted from the fluorescent lights 304a and 304b enters into the transparent plate 305 from the planar ends of the plate 305 and is transmitted within the transparent plate 305 while being multiply reflected within the transparent plate 305. A light scattering transmissive plate 306 formed of, for example, a milk white acryl plate is disposed at the front of the transparent plate 305 and light irregularly reflected by the light scattering plate 306 is emitted therefrom with a substantially uniform distribution of intensity. However, more strictly, intensity of light is stronger at locations near the fluorescent lights.

An advertising film 307 on which copy for advertisement or information sentence is depicted is disposed in close contact with the front surface of the light scattering plate 306. A front plate 308 formed of a milk white acryl plate or a half-mirror acryl plate is further disposed at the front of the film 307. When the fluorescent light is turned on, the advertising film 307 is illuminated from the back thereof by uniform light and consequently the copy or information sentence can be read or appears from the outside through the front plate. When the fluorescent light is turned off, the front plate is a mere milk white plate in the case where the front plate is a milk white acryl plate, while the front plate is a mirror and reflects the street or the inside of a store in the case where the front plate is a half-mirror.

A front frame 309 of the advertisement display unit 303 is rotatably mounted at the lower portion thereof to a body of the unit by means of a hinge 310 and is locked at the back side thereof by means of a lock 311. Upon adjustment of the fluorescent lights 304a and 304b and a glow discharge tube 312 and exchange of the advertising film 307, the lock 311 is released and the frame 309 is angularly moved around the hinge 310 so that the adjustment of the lights and the tube and the exchange of the film are made if necessary.

In an embodiment shown in FIGS. 11 and 12, an advertisement display unit 303a is mounted on a post or a wall surface 302a near a telephone 301a through an attachment 313a. This embodiment is particularly suitable for use in a telephone box.

An internal structure of the embodiment is substantially identical with that of FIG. 10 and is now described with reference to FIG. 13.

Fluorescent lights 404c and 404d are disposed as illuminating units at the upper and lower portion in the advertising apparatus. A rectangular transparent plate 405a formed of, for example, glass or acryl resin and having planar ends opposed to the fluorescent lights 404c and 404d is disposed between both the fluorescent lights 404c and 404d as a light transmitting plate. Light emitted from the fluorescent lights 404c and 404d enters into the transparent plate 405a from the planar ends thereof and is transmitted within the transparent plate 405a while being multiply reflected within the transparent plate.

A light scattering transmissive plate 406a formed of, for example, a milk white acryl plate is disposed at the front of the transparent plate 405a and light irregularly reflected by the light scattering plate 406a is emitted therefrom with a substantially uniform distribution of intensity. However, more strictly, the intensity of light is stronger at locations near the fluorescent lights.

An advertising film 407a on which copy for advertisement or an information sentence is depicted is disposed in close contact with the front surface of the light scattering plate 406a. A front plate 408a formed of a milk white acryl plate or a half-mirror acryl plate is further disposed at the front of the film 407a. When the fluorescent light is turned on, the advertising film 407a is illuminated from the back thereof by uniform light and consequently the copy or information sentence can be read from the outside or appears through the front plate. When the fluorescent light is turned off, the front plate is a mere milk white plate in the case where the front plate is a milk white acryl plate, while the front plate is a mirror and reflects the street or the inside of a store in the case where the front plate is a half-mirror.

A front frame 409a of the advertising apparatus is rotatably mounted at the lower portion thereof to a body of the unit by means of a hinge 410a and is locked at the back side thereof by means of a lock 411a. Upon adjustment of the fluorescent lights 404c and 404d and a glow discharge tube 412a and exchange of the advertising film 407a, the lock 411a is released and the frame 409a is angularly moved around the hinge 410a so that the adjustment of the lights and the tube and the exchange of the film are made if necessary.

Lifting up a handset of a telephone from a cradle thereof, receiving a coin from a slot, inserting a card from a card inlet, inputting dial pulses by dialing, receiving a signal between the telephone and a telephone office or the like is detected by a detector and an illumination controller 414 is operated in response to a signal from the detector to control a power source 415 for the illuminating unit 404.

Figures 15, 16:
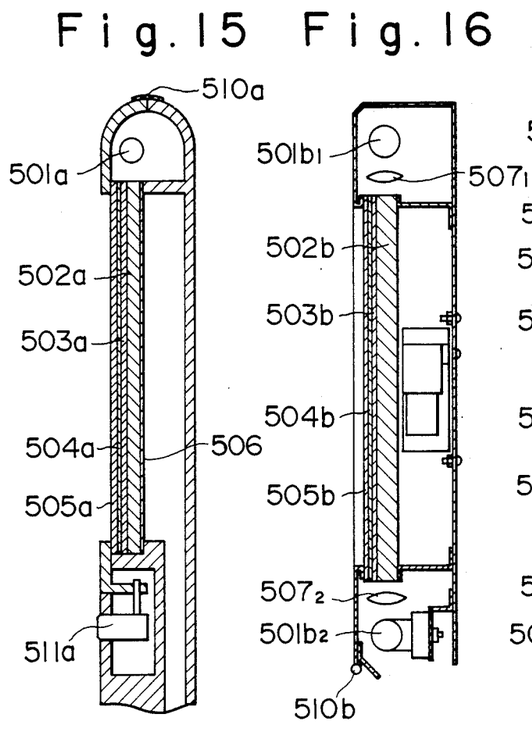
FIGS. 15, 16 and 17 are cross-sectional elevation views of preferred embodiments of an information display apparatus according to the present invention.
Figure 17:
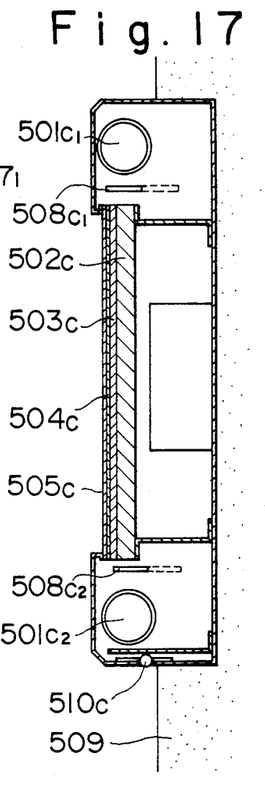
Figure 19:
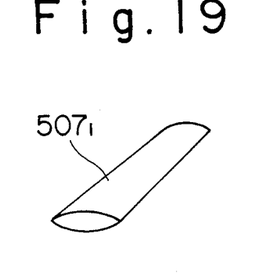
FIG. 19 is a perspective view of a cylindrical convex lens.

FIGS. 15 to 17 are cross-sectional views of a main portion of preferred embodiments of an information display unit according to the present invention.

In this embodiment, fluorescent lights 501a, 501$b_1$, 501$b_2$, 501$c_1$ and 501$c_2$ are used as illuminating sources and transparent plates each formed of, for example, glass or acryl resin and having planar ends opposed to the fluorescent lights are disposed near the fluorescent lights as light transmitting plates 502a, 502b and 502c, respectively. Light of the fluorescent lights enters into the transparent plates 502a, 502b and 502c from planar ends of the transparent plates and is transmitted within the transparent plates having the front surface and the rear surface being parallel to each other while being multiply reflected in the plates. Light scattering transmissive plates 503a, 503b and 503c formed of, for example, a milk white acryl plate are disposed at the front of the transparent plate. Light irregularly reflected by the light scattering plate is emitted from the front surface thereof with a substantially uniform intensity distribution of light. However, more strictly, the intensity of light is stronger at locations near the fluorescent lights.

Information display films 504a, 504b and 504c on which copy for an advertisement or information sentence is depicted are disposed in close contact with the front surface of the light scattering plate. Front plates 505a, 505b and 505c formed of a milk white acryl plate or a half-mirror acryl plate are further disposed before the film. When the fluorescent light is turned on, the information display film is illuminated from the back side thereof by uniform intensity of light and the copy or information sentence can be read or seen from the outside through the front plate. When the fluorescent light is not turned on, the front plate is a mere milk white plate in the case where the front plate is a milk white acryl plate, while the front plate is a mirror which reflects a street or the inside of a store in the case where the front plate is a half-mirror.

In the embodiment of FIG. 15, a light reflecting plate 506 is disposed at the back side of the light transmitting plate 502a so that light transmitted within the light transmitting plate 502a is emitted only from the side on which the light scattering plate 503a is disposed. The light reflecting plate 506 is formed by finishing its surface to be a silvered mirror, by attaching a metal thin film or by applying white paint. In the embodiment of FIG. 17, a thin metal film is attached to the plate. Consequently, the information picture display is light.

In the embodiment of FIG. 16 in order to enter light from the fluorescent lights 501$b_1$ and 501$b_2$ into the light transmitting plate 502b efficiently cylindrical convex lenses 507$_1$ and 507$_2$ are disposed between each of the fluorescent lights and the light transmitting plate. At this time, it is desirable that the focal distance of the cylindrical convex lenses, positions of the fluorescent lights, the cylindrical lenses and an end surface of the light transmitting plate are determined so that an image of the fluorescent light is formed within the light transmitting plate rather than the end surface of the plate. In this case, the information picture display is light.

In the embodiment of FIG. 17, shutters or filters 508$c_1$ and 508$c_2$ are disposed between each of the fluorescent lights 501$c_1$ and 501$c_2$ and the light transmitting plate. The shutters or the filters are inserted into a light path or removed from the light path by a control means (not shown).

The embodiment is used in a place where frequency of people passing the device is high. The fluorescent lights are continuously turned on and the information picture display can be controlled to be light or dark by inserting and removing the shutters having a small mass.

Inserting and removing of the filter can change the background color of the information picture display and enhance the excitation of attention. Additional information such as emergency degree, finality and the like can be transmitted by color.

The shutter and the filter can be provided not only alternatively but also serially.

The information display apparatus of FIG. 17 is an embodiment which is embedded in a wall 509 of a building.

In the embodiments of FIGS. 15 to 17, the front surface of the frame is opened around the hinges 510a, 510c and 510c, respectively, and the information display film can be exchanged. However, it is not an indispensable condition that the front surface of the frame is mounted by the hinge and it may be commonly mounted by using screws.

In the embodiment of FIG. 15, the front surface of the frame is locked by the lock 511a. However, the provision of the lock in any embodiment is a design of choice. This is determined by kinds of information to be displayed and the desire of a user of the information display apparatus or the like.

The light source is not necessarily limited to the fluorescent light. For example, an incandescent electric light, a light emitting diode, a mercury light and a laser light may be used if necessary or if a cost thereof is allowed.

The light transmitting plate is not necessarily limited to a single plate. A slit may be provided perpendicularly to the end surface of the light transmitting plate opposed to the light source and a light shielding plate is inserted into the slit if necessary, a shutter or a filter being disposed between the end surface and the light source so that a plurality of information can be displayed alternatively or in parallel.

The presence of a person near the information display apparatus is detected by an output signal of an optical detection means or an output signal produced when the person operates a particular device.

There are many methods of controlling the apparatus on the basis of the above signal. In a first control method, a signal is applied to control means CONT (broken line a of FIG. 18) during the period when an output signal of the optical detection means S1, for example, which is an ON-OFF switch is continued and the fluorescent light is turned on during the period. In a second control method, a set signal is applied to a flip-flop circuit FF in response to an output signal produced when a particular device S2 is operated. Thus, an output of the flip-flop circuit FF is reversed and at the same time a start signal is applied to a timer circuit TIMER to start the counting thereof. The output signal of the flip-flop circuit FF is supplied to the control means CONT (broken line b of FIG. 18) and the fluorescent light is turned on. When a predetermined time lapses, the timer circuit TIMER supplies a reset signal to the flip-flop circuit FF to reverse the output thereof. Thus, the fluorescent light is turned off by means of the control means CONT.

Further, the output signal of the optical detection means S1 may be applied to the flip-flop circuit and the timer circuit, or the output signal produced when the particular device S2 is operated may be directly applied to the control means (either circuit is not shown). It can be realized as a design of choice that an ordinary push switch, a magnetic switch, an acoustic switch or the like is used as the ON-OFF switch.

Figures 13, 14, 18:
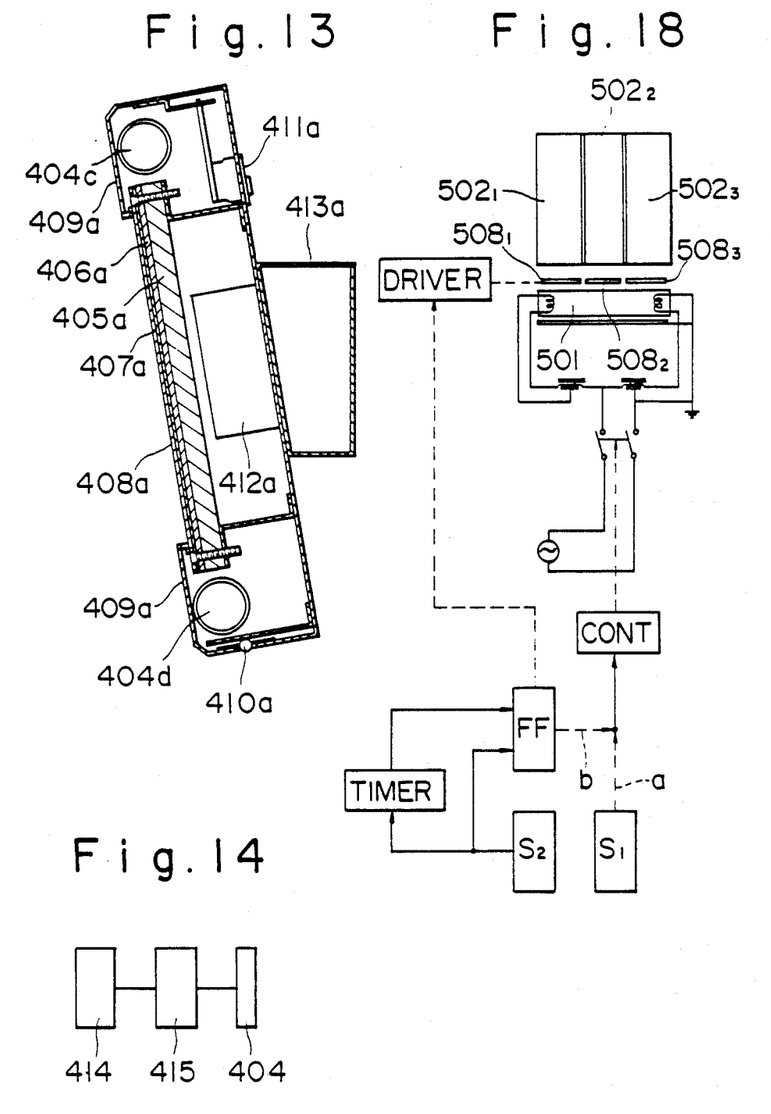
FIG. 13 is a partial cross-sectional view of the embodiment of FIG. 11.
FIG. 14 is a block diagram of a lighting circuit when an illumination unit contains a fluorescent light.
FIG. 18 is a schematical block diagram of a preferred embodiment of a control system of an information display apparatus according to the present invention.

The light transmitting plate of the information display apparatus of FIG. 18 is provided with slits formed perpendicularly to the end surface opposed to the fluorescent light. When only the provision of slits between three acryl plates $502_1$, $502_2$ and $502_3$ is insufficient to shield light, light shielding plates formed of, for example, black acryl plates are preferably inserted into the slits to prevent light from being mixed with each other.

Shutters or filters are inserted between each of the acryl plates $502_1$, $502_2$ and $502_3$ and the fluorescent light 501.

For example, shutters $508_1$, $508_2$ and $508_3$ which move in the perpendicular direction to the paper of FIG. 18 are disposed between each of the acryl plates $502_1$, $502_2$ and $502_3$ and the fluorescent light, and each of the shutters $508_1$, $508_2$ and $508_3$ are independently moved so that information display films, not shown, corresponding to each of the acryl plates $502_1$, $502_2$ and $502_3$ can be independently illuminated.

There may be provided filters which are inserted or removed between each of the acryl plates and the fluorescent light instead of the shutters $508_1$, $508_2$ and $508_3$, so that the color of the information display film can be independently changed.

The insertion or removal of the shutters or filters can be made by hand at regular intervals, while it is desirable to use a driver unit DRIVER such as a solenoid or a stepping motor. The driver unit can be controlled by an output of the flip-flop circuit FF. In this case, illumination for the information display film can be controlled in the condition that the fluorescent light is lighted.

Various applications of the information display apparatus according to the present invention are exemplified as follows.

1. A movable parking apparatus in a parking tower is provided with a mirror disposed at the front thereof to confirm a stop position of an automobile. The light transmission front plate according to the present invention is applied to this mirror. The mirror is changed to an advertising plate or an information display plate after the automobile has been stopped. In this case, it is preferred that the ON-OFF switch is a footboard type switch disposed at a position in which a tire of the automobile is placed.

2. The information display apparatus according to the present invention may be incorporated into a box of a parking meter.

3. The information display apparatus according to the present invention may be incorporated into a calling panel in an elevator.

4. The information display apparatus according to the present invention may be embedded in an internal wall of an elevator, a halfpace of stairs in a department store and an internal wall in a building such as, for example, a toilet room of department store, a reception place in a hotel and the like.

5. The information display apparatus according to the present invention may be embedded in a door of a toilet and a door of an entrance of a store. (This application is possible since the information display apparatus is thin.)

6. The information display apparatus according to the present invention may be incorporated into a box of an automatic vending machine for paper bags.

7. The information display apparatus according to the present invention may be incorporated into a box of an automatic vending machine for tickets, magazines and the like.

8. The information display apparatus according to the present invention may be incorporated into a box for a price display meter in a highway, a gasoline station and the like.

Figure 20:
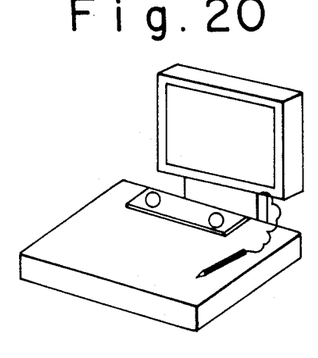
FIG. 20 is a perspective view of an entry stand of a bank incorporating an information display apparatus according to the present invention.

9. The information display apparatus is incorporated into an entry stand of a bank (refer to FIG. 20).

10. The information display apparatus according to the present invention may be incorporated into a box for a cash service apparatus.

11. The information display apparatus according to the present invention may be incorporated into a display device for a map displaying the neighborhood of a station.

12. The information display apparatus according to the present invention may be incorporated into a partition member between a taxi driver seat and a rear seat.

13. The information display apparatus may be embedded in a wall in a school, a theater, a hospital, a public office and the like, or independently provided as a pure information display apparatus.

I claim:

1. An information display apparatus comprising:
   at least one fluorescent light source and means for controlling the illumination of said light source including
   a controller for turning said fluorescent light source ON and OFF,
   a signal input unit having an ON-OFF switch for controlling the operation of said controller,
   a timer circuit for initiating operation of said signal input unit in response to a signal from said ON-OFF switch, and
   a flip-flop circuit which is set by an output of said ON-OFF switch and is reset by an output of said timer circuit, said output signal of said flip-flop circuit being an input signal of said controller;
   a light reflecting plate;
   a light transmitting plate having one major surface in contact with one major surface of said light reflecting plate, said at least one fluorescent light source entering said light transmitting plate from a side end thereof and being reflected by the surface of said light reflecting plate;

a lens system for focussing an image of said light source into the interior of said light transmitting plate;

a milk white acryl plate as a light scattering transmissive plate disposed on another major surface of said light transmitting plate;

an information display film disposed on a viewing side of said light scattering plate;

a half-mirror acryl plate as a light transmissive front plate mounted over said information display film;

a frame body for supporting said light reflecting plate, said light transmitting plate, said light scattering transmissive plate, and said light transmissive front plate.

2. An information display apparatus according to claim 1, wherein said means for controlling the illumination of said light source turns said light source ON and OFF in response to used and unused conditions of a telephone upon which said information display apparatus is mounted.

3. An information display apparatus according to claim 1, wherein said information display film is formed of plastic.

4. An information display apparatus according to claim 1, including a color filter disposed between said light source and said light transmitting plate.

5. An information display apparatus according to claim 1, including a light shutter disposed between said light source further and said light transmitting plate.

6. An information display apparatus according to claim 1, wherein said light transmitting plate is composed of a plurality of light transmitting plates separated from each other by a corresponding plurality of shield means.

* * * * *